United States Patent [19]
Yoshida

[11] Patent Number: 4,813,347
[45] Date of Patent: Mar. 21, 1989

[54] SYSTEM FOR MANUFACTURING SOYBEAN POWDER

[76] Inventor: Koichi Yoshida, 19-31, Todaijima 1-chome, Urayasu-shi, Chiba 272-01, Japan

[21] Appl. No.: 188,064

[22] Filed: Apr. 27, 1988

Related U.S. Application Data

[63] Continuation of Ser. No. 877,797, Jun. 24, 1986, abandoned.

[30] Foreign Application Priority Data

Jun. 24, 1985 [JP] Japan .................................. 60-137176
Aug. 31, 1985 [JP] Japan .................................. 60-192478

[51] Int. Cl.$^4$ .......................... A23C 3/02; A23J 1/00; A23L 1/20
[52] U.S. Cl. ........................................ 99/483; 99/453; 99/468; 99/486; 99/516

[58] Field of Search ................ 99/516, 568, 483, 538, 99/472, 469, 600, 601, 637, 519; 426/431, 464, 486, 482; 241/76, 78, 11, 13, 2, 7, 29

[56] References Cited

U.S. PATENT DOCUMENTS

3,981,234 9/1976 Nelson et al. ......................... 99/483
4,076,851 2/1978 Tunoda .............................. 99/568 X Primary Examiner—Timothy F. Simone
Attorney, Agent, or Firm—Staas & Halsey

[57] ABSTRACT

A soybean processing system separates whole soybeans into cotyledons and hulls, and separates the cotyledons into two outlets. The cotyledons from one of the outlets are processed into a deodorized soybean powder, whereas the cotyledons from the other outlet are processed into a nondeodorized soybean powder. Therefore, two types of soybean powder are produced by the single system. The protein contained in the deodorized soybean powder is coagulated into a soybean curd which is formed to a certain shape.

19 Claims, 7 Drawing Sheets

SYSTEM FOR MANUFACTURING SOYBEAN POWDER

This is a continuation of co-pending application Ser. No. 877,797 filed on June 24, 1986 now abandoned.

BACKGROUND OF THE INVENTION

1. Field of the Invention

The present invention relates to a soybean processing system for manufacturing deodorized fine soybean powder for use as soybean milk or as a bulking or improver additive to be added to foods such as bread, cakes, and the like, for manufacturing nondeodorized fine soybean powder for use as a soybean curd or "tofu" material, and for manufacturing soybean curd from the nondeodorized fine soybean powder.

2. Description of the Prior Art

Soybeans are a highly nutritious food source having a high protein content, and used as materials for foods such as soybean curd known as "tofu". There has recently been proposed a process of manufacturing soybean curd from nondeodorized soybean powder which is produced by dehulling soybeans and processing them into fine powder. Deodorized soybean powder is used as a bulking or improver additive to be added to foods such as bread, cakes, cookies and the like. Japanese Laid-Open Patent Publication No. 48(1973)-19946, for example, discloses a process of manufacturing deodorized soybean powder for food uses. According to the disclosed process, cleaned whole soybeans are first compressed, but not defatted, and then dried in a low-temperature, hot-air atmosphere to the extent that the water content thereof is about 3%. Thereafter, the dried soybeans are cracked into a coarse size of about 10 mesh and dehulled into cotyledons which are then steamed in a steaming pot for a short period of time. Odor is removed from the fat and water is removed from the cotyledons under vacuum suction for a short interval of time. Then, the cotyledones are ground successively into medium and fine sizes in a constant-temperature bath.

The nondeodorized soybean powder and the deodorized soybean powder find respective uses. There has been a demand for a system for efficiently manufacturing these different types of soybean powder.

One process of manufacturing soybean curd from soybean powder is disclosed in Japanese Laid-Open Patent Publication No. 51(1976)-95175, for example. The disclosed process comprises the steps of producing soybean milk by stirring soybean powder and water in a stirring tank to form soybean milk, heating the soybean milk in a heating tank, putting the heated soybean milk in a tiltable tank, and tilting the tiltable tank to discharge the heated soybean milk into a receiver tank containing a coagulant for thereby coagulating the soybean milk therein into soybean curd.

However, the aforesaid steps of the above disclosed are all carried out manually, and hence tedious and time-consuming. It is difficult to effect the steps accurately within respective required time periods, and also to keep resulting soybean curd products uniform in quality at all times.

SUMMARY OF THE INVENTION

It is an object of the present invention to provide a soybean processing system capable of efficiently manufacturing two types of soybean powder, i.e., nondeodorized soybean powder and deodorized soybean powder from soybeans, and of automatically manufacturing soybean curd from the nondeodorized soybean powder.

Another object of the present invention is to provide an apparatus capable of automatically manufacturing soybean curd of stable quality simply by supplying the apparatus with soybean powder and water and turning on a starter switch.

According to the present invention, two types of soybean powder, i.e., nondeodorized soybean powder and deodorized soybean powder can efficiently be manufactured by a single manufacturing system.

Furthermore, soybean curd of stable quality can automatically automatically be manufactured simply by supplying the apparatus with soybean powder and water and applying a starting command.

According to the present invention, there is provided a soybean processing system for preparing a nondeodorized soybean powder and a deodorized soybean powder for use as food additives, and for automatically manufacturing soybean curd from the nondeodorized soybean powder, the soybeans processing system comprising a separator for separating the soybeans into hulls and cotyledons, dividing means for dividing and discharging the cotyledons into two outlets, deodorizing means for deodorizing the cotyledons discharged from one of the outlets and processing the deodorized cotyledons into deodorized soybean powder, and a second device for processing the cotlyedons discharged from the other outlet into nondeodorized soybean powder.

According to the present invention, there is provided a soybean processing system for preparing a nondeodorized soybean powder and a deodorized soybean powder for use as food additives, and for automatically manufacturing soybean curd from the deodorized soybean powder, the soybean processing system comprising a separator for separating the soybeans into hulls and cotyledons, dividing means for dividing and discharging the cotyledons into two outlets, deodorizing means for deodorizing the cotyledons discharged from one of the outlets and processing the deodorized cotyledons into a deodorized soybean powder, means for processing nondeodorized cotyledons discharged from the other outlet to produce a nondeodorized soybean powder, and an apparatus for manufacturing soybean curd from the deodorized soybean powder, comprising a stirring tank having stirring means for stirring the deodorized soybean powder and water to produce a soybean milk therefrom, a boiling tank for receiving and boiling the soybean milk; means for introducing the soybean milk into the boiling tank; steam supply means for supplying steam to the boiling tank; a forming tank for receiving the boiled soybean milk from the boiling tank and mixing the milk with a coagulant to cause the soybean milk to coagulate; means for discharging the boiling soybean milk from the boiling tank and into the forming tank; and a control unit for successively operating the stirring means, the introducing means, the steam supply means, and the discharging means.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
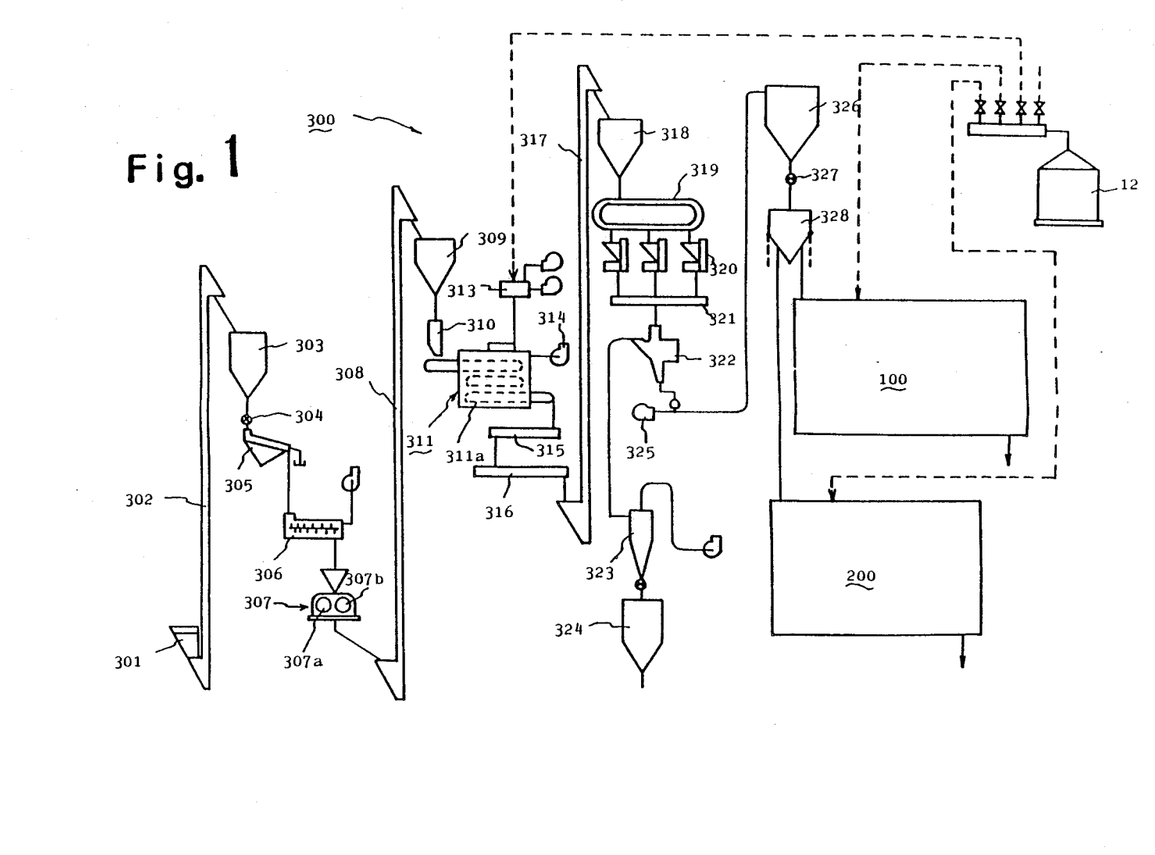
FIG. 1 is a schematic diagram of a soybean processing system according to an embodiment of the present invention.

FIG. 1 shows a soybean processing system according to the present invention. The system includes a device 300 for separating soybeans into hulls and cotyledons. Whole soybeans are charged into a hopper 301, and then fed by a bucket elevator 302 to a tank 303 in which the whole soybeans are temporarily stored. Thereafter, the whole soybeans are delivered via a rotary valve 304 to a separator 305 which removes foreign matter such as small stones, sand, straws, and the like from the whole soybeans. The whole soybeans are then fed to a brushing machine 105 having a brush which grinds and cleans the whole soybeans without the use of water. The cleaned soybeans are thereafter supplied to a scarring machine 307. The scarring machine 307 has two knurled rolls 307a, 307b for scarring the hulls of the whole soybeans passing therebetween. The whole soybeans with their hulls thus scarred are transported by a bucket elevator 308 into a service tank 309 from which they are fed via a slide gate 310 into a drying machine 311. The drying machine 311 is connected to a hot-air oven 313 which is supplied with heated steam from a boiler 12 to produce hot air through heat exchange. Hot air of about 73° C. is introduced from the hot-air oven 313 into the drying machine 311 to generate a hot atmosphere therein. The scarred whole soybeans are kept in the drying machine 311 for about one hour so that they are dried to the extent that the water content of the soybeans ranges from 6.0 to 6.2% by weight. The drying machine 311 has a multistage conveyor 311a for conveying the scarred soybeans, and is connected to an air discharger 314 which discharges hot air at a temperature of about 55° C. Since the hulls and cotyledons have different drying shrinkage factors and the hulls have already been scarred, the whole soybeans thus dried will easily been separated into the hulls and cotyledons. The dried whole soybeans are transported by screw conveyors 315, 316 and a bucket elevator 317 into a service tank 318, from which they are distributed and charged by a chain conveyor 319 into a plurality of dehulling machines 320. The dehulling machines 320 remove the hulls while at the same time cracking most of the cotyledons into coarse size of 4 to 8 mesh. The cracked hulls and cotyledons are then fed by a collecting conveyor 321 into a classifier 322, which separates the hulls and the cotyledons. The hulls are fed through a cyclon 323 into a hull storage tank 324 where they are stored. The cotyledons are pneumatically fed under pressure by a blower 325 to a storage tank 326 where they are stored. The cotyledons stored in the storage tank 326 are then delivered via a rotary valve 327 into a divider 328, which divides the cotyledons into a device 100 for manufacturing deodorized soybean powder and a device 200 for manufacturing nondeodorized soybean powder dependent on the type of soybean powder to be formed or at a prescribed ratio.

These devices 100, 200 will be described in detail with reference to FIGS. 2 and 3.

Figure 2:
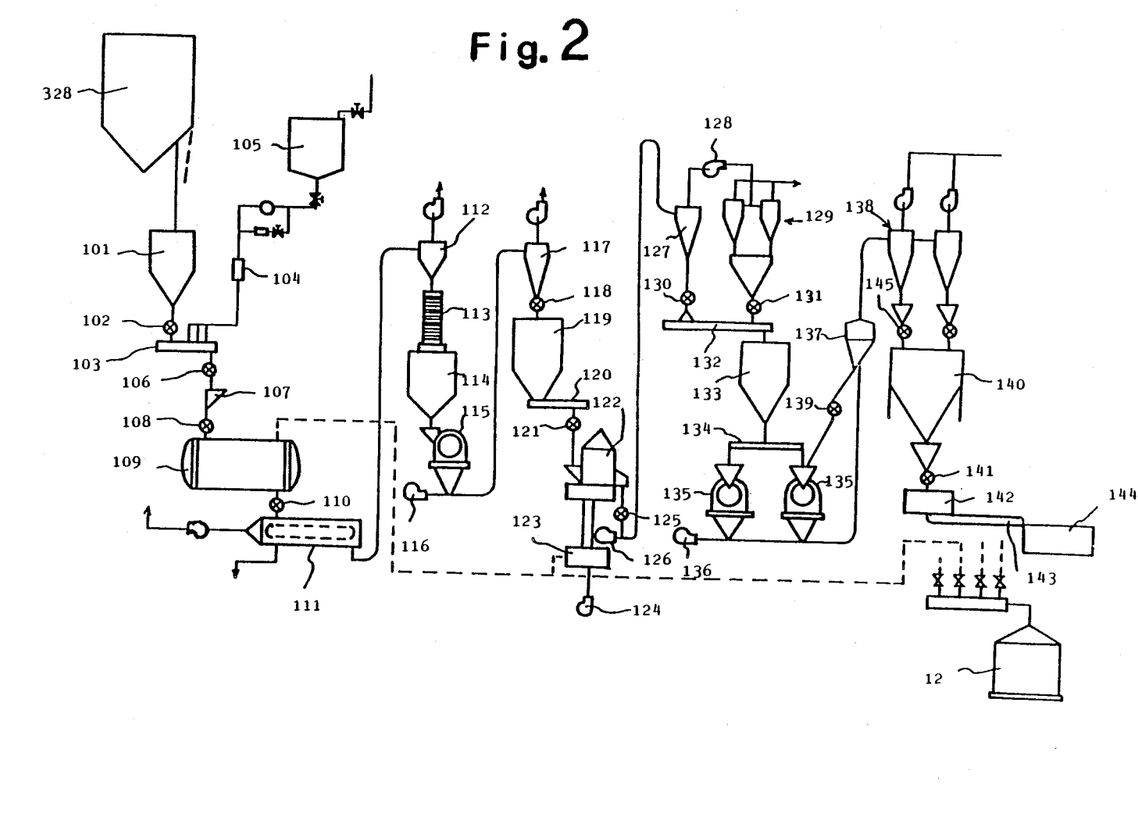
FIG. 2 is a schematic diagram of a device for manufacturing deodorized soybean powder in the system shown in FIG. 1.

FIG. 2 schematically illustrates the device 100 for manufacturing deodorized soybean powder. The soybean cotyledons divided by the divider 328 are charged into a storage tank 101, from which they are delivered via a rotary valve 102 into a water adder 103 connected to a water tank 105 through a flowmeter 104. The water adder 103 thus adds a small amount of water from the water tank 105 to the cotyledons introduced into the water adder 103. The cotyledons to which water has been added are introduced via a rotary valve 106 into a steam hopper 107 and then via a rotary valve 108 into a deodorizer 109. The deodorizer 109 introduces steam of a temperature ranging from 100° to 120° C. from the boiler 12 to steam the cotyledons for about 2 minutes for removing odor from the cotyledons. Since the water added by the water adder 103 has been absorbed by the cotyledons, the water absorbed by the cotyledons is heated in the steaming process, so that the odor can reliably be removed from within the cotyledons in the steaming process. The deodorized cotyledons are discharged from the deodorizer 109 and delivered into a cyclon 112 via a rotary valve 110 and a pneumatic conveyor 111. The cotyledons are then introduced from the cyclon 112 into a cooling device 113, and then the cooled cotyledons are fed from the cooling device 113 to a storage tank 114, from which they are delivered to a crusher 115. The crusher 115 cracks the supplied cotyledons into coarse sizes of 25 to 30 mesh. The cracked cotyledons are pneumatically fed under pressure by a blower 116 into a cyclon 117 and delivered therefrom through a rotary valve to a storage tank 119. The cracked cotyledons are thereafter transferred via a screw conveyor 120 and a rotary valve 121 to a fluid drier 122. The fluid drier 122 is supplied with hot air of about 70° C. via a blower 124 from a hot-air oven 123 which is fed with steam from the boiler 12. The cracked cotyledons are therefore heated by the hot air in the fluid drier 122 for about 15 minutes until the water contennt of the cracked cotyledons is reduced to a range of from 4.5 to 6.7% by weight. The cracked cotyledons can be well dried by the fluid drier 122 in a short period of time because they have already been coarsely cracked by the crusher 115. The dried cracked cotyledons are then fed out through a rotary valve 125, and pneumatically fed under pressure by a blower 126 to a cyclon 127. The dried cracked cotyledons supplied to the cyclon 127 are also fed to a double cyclon 129 by a blower 128. The dried cracked cotyledons are thereafter introduced from the cyclons 127, 129 via respective rotary valves 130, 131 and a screw conveyor 132 into a storage tank 133. The cracked cotyledons from the storage tank 133 are distributed and charged by a screw conveyor 134 into a plurality of grinders 135, which grind the dried cracked cotyledons into fine soybean powder having a particle size of 100 to 300 mesh at normal temperature. The fine soybean powder produced by the grinders 135 is then pneumatically fed under pressure by a blower 136 to a classifier 137 that classifies the supplied fine soybean powder into soybean power of a particle size smaller than 300 mesh, which is fed to cyclons 138, and soybean powder of a larger particle size, which is fed back to one of the grinders 135 via a rotary valve 139. The fine soybean powder of a particle size less than 300 mesh is transported from the cyclons 138 via rotary valves 139 into a storage tank 140 where it is stored. The deodorized fine soybean powder stored in the storage tank 140 is thereafter supplied through a rotary valve 141 to a weighing device 142, which weighs the soybean powder in prescribed quantities that are delivered on a conveyor 143 to a packaging machine 144, by which they are packaged.

Figure 3:
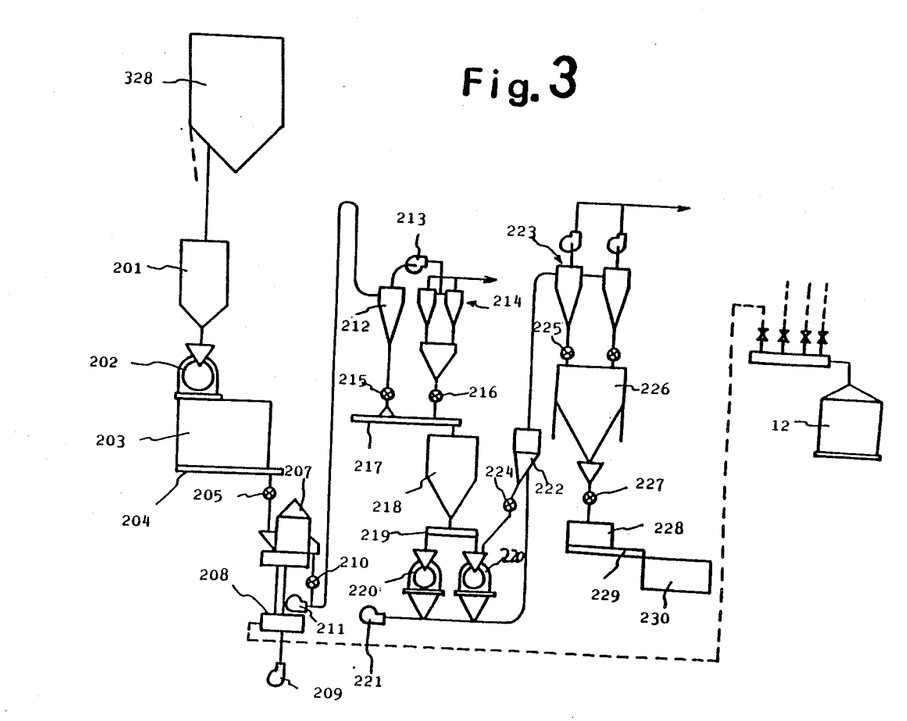
FIG. 3 is a schematic diagram of a device for manufacturing nondeodorized soybean powder in the system shown in FIG. 1.

FIG. 3 shows the device 200 for manufacturing nondeodorized soybean powder. The soybean cotyledons divided by the divider 328 and supplied to the apparatus 200 are charged into a storage tank 201 from which they are introduced into a crusher 202. The crusher 202 cracks the cotyledons into a size ranging from 20 to 30 mesh, and the cracked cotyledons are fed to a storage tank 203 which feeds them to a fluid drier 207 via a screw conveyor 204 and a rotary valve 205. The fluid drier 207 heats the cracked cotyledons for about 15 minutes with hot air of about 70° C. supplied by a blower 209 from a hot-air oven 208 which is fed with steam from the boiler 12. The water content of the cotyledons is reduced by the fluid driver 207 from a range of 6.0 to 6.2% by weight to a range of 4.5 to 6.7% by weight. The dried cracked cotyledons are then fed out through a rotary valve 210 and pneumatically fed under pressure by a blower to a cyclon 212. The dried cracked cotyledons supplied to the cyclon 212 are also transferred to a double cyclon 214. The dried cracked cotyledons are then supplied from the cylons 212, 214 via respective rotary valves 215, 216 and a screw conveyor 217 into a storage tank 218, from which they are distributed and charged into a plurality of grinders 220 by a screw conveyor 219. The dried cracked cotyledons are ground at normal temperature by the grinders 220 into fine soybean powder having a particle size ranging from 100 to 300 mesh. The fine soybean powder is pneumatically delivered under pressure by a blower 221 to a classifier 222 that classifies the supplied fine soybean powder into soybean power of a particle size smaller than 300 mesh, which is fed to cyclons 223, and soybean powder of a larger particle size, which is fed back to one of the grinders 220 via a rotary valve 224. The fine soybean powder of a particle size less than 300 mesh is transported from the cyclons 223 via rotary valves 225 into a storage tank 226 where it is stored. The nondeodorized fine soybean powder stored in the storage tank 226 is thereafter supplied through a rotary valve 227 to a weighing device 228, which weighs the soybean powder in prescribed quantities that are delivered on a conveyor 229 to a packaging machine 230, by which they are packaged.

With the arrangement of the present invention, as described above, two types of soybean powder, i.e., deodorized soybean powder and nondeodorized soybean powder can efficiently be manufactured by a single manufacturing system. The manufacturing system requires a small installation space and is economical.

Figure 4:
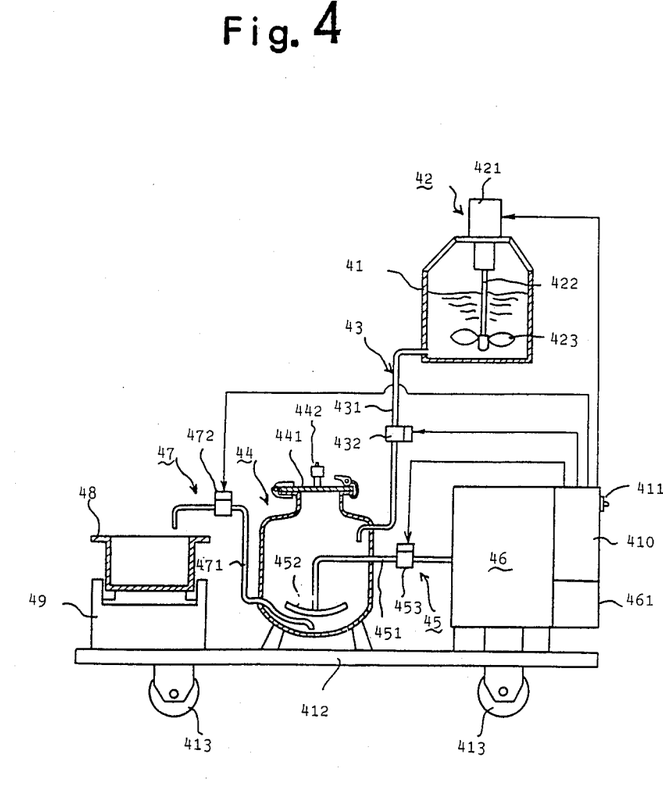
FIG. 4 is a side elevational view showing a process of manufacturing soybean curd according to the present invention.

FIG. 4 schematically illustrates an apparatus for manufacturing soybean curd known as "tofu" from soybean powder. The apparatus includes a stirring tank 41 for containing soybean powder and water. The stirring tank 41 has a stirring means 42 comprising an electric motor 421, a shaft 422 rotatable by the motor 421, and an impeller 423 mounted on the distal end of the shaft 422. When the impeller 423 is rotated about its own axis by the motor 421, the soybean powder and water supplied to the stirring tank 41 from the nondeodorized soybean powder manufacturing device 200 are stirred into homogenous soybean milk. The soybean milk formed in the stirring tank 41 is introduced by an introducing means 43 from the stirring tank 41 into a boiling tank 44. The introducing means 43 comprises a conduit 431 having one end connected to a lower portion of the stirring tank 41 and an opposite end to the boiling tank 44, and a solenoid-operated valve 32 disposed in the conduit 431.

The boiling tank 44 serves to boil the soybean mild introduced therein from the introducing means 43. The boiling tank 44 has a sealing cover 441 to which a pressure regulating valve 441 for keeping the pressure in the boiling tank 44 at a substantially constant level to guard against an undue pressure upsurge in the boiling tank 44.

Steam having a temperature ranging from 100° to 120° C. generated by a boiler 46 is supplied to the boiling tank 44 by a steam supply means 45. The steam supply means 45 comprises a conduit 451 interconnecting the boiler 46 and the boiling tank 44, a nozzle 452 mounted on the end of the conduit 451 disposed in the boiling tank 44, and a solenoid-operated valve 453 disposed in the conduit 451.

The boiled soybean milk is discharged from the boiling tank 44 by a discharge means 47 comprising a conduit 471 having one end connected to a lower portion of the boiling tank 44 and an opposite end opening above a forming tank 48, and a solenoid-operated valve 472 disposed in the conduit 471.

The forming tank 48 is placed on a roller conveyor 49 and supplied with a coagulant such as a solution of gluconic delta lactone or a solution of calcium sulfate. The boiled soybean milk introduced by the discharge means 47 into the forming tank 48 is mixed with the coagulant into soybean curd.

The motor 421 of the stirring means 42, the solenoid-operated valve 432 of the introducing means 43, the solenoid-operated valve 453 of the steam supply means 45, the solenoid-operated valve 472 of the discharge means 47, and a controller 461 for the boiler 46 are controlled by a control unit 410 which may comprise a microcomputer. The control unit 410 is supplied with a starting signal applied by a starter switch 411 mounted on the control panel of the control unit 410.

The aforesaid components of the apparatus for manufacturing soybean curd are mounted on a base 412 having casters 413, so that the apparatus is easily movable.

Figure 5:
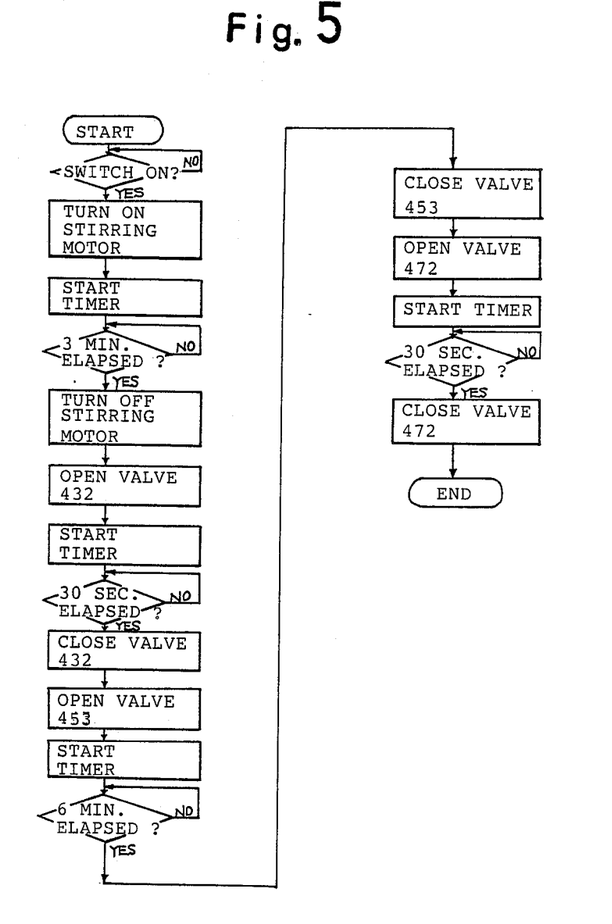
FIG. 5 is a flowchart of an operation sequence for the apparatus shown in FIG. 4.

Operation a portion of the apparatus for manufacturing soybean curd will be described with reference to FIG. 5.

For making soybean curd, soybean powder and water are manually supplied to the stirring tank 41 by the operator, who then turns on the starter switch 411. The apparatus now starts to operate in the following sequence:

(1) The control unit 410 ascertains whether the starter switch 411 is turned on or not. If turned on, the control unit 410 energizes the motor 421 of the stirring means 42. The impeller 423 is rotated to stir the soybean powder and water in the stirring tank 41 to produce soybean milk. At the same time that the motor 421 is turned on, the control unit 410 starts a timer therein.

(2) Then, the control unit 410 ascertains whether the timer has operated for 3 minutes or not. If 3 minutes has elapsed, then the control unit 410 turns off the motor 421 and opens the solenoid-operated valve 432 of the introducing means 43 to introduce the soybean milk from the stirring tank 41 through the conduit 431 into the boiling tank 44. The control unit 410 starts a timer at the same time that it issues a command to open the solenoid-operated valve 432.

(3) The control unit 410 ascertains whether the timer has operated for 30 seconds or not. If 30 seconds has elapsed, then the control unit 410 closes the solenoid-operated valve 432 and opens the solenoid-operated valve 453 of the steam supply means 45. The steam of a temperature ranging from 100° to 120° C. is supplied from the boiler 46 through the conduit 451 and the nozzle 452 into the boiling tank 44 to boil the soybean milk for a given period of time such as 6 minutes. The control unit 410 starts a timer at the same time that it issues a command to open the solenoid-operated valve 453.

(4) The control unit 410 ascertains whether the timer has operated for 6 minutes or not. If 6 minutes has elapsed, then the control unit 410 closes the solenoid-operated valve 453 and, upon elapse of a steaming time, opens the solenoid-operated valve 472 of the discharge means 47. The boiled soybean milk is now discharged from the boiling tank 44 under the pressure therein through the conduit 471 into the forming tank 48. At the same time that the control unit 410 issues a command to open the solenoid-operated valve 472, the control unit 410 starts a timer, and upon elapse of 30 seconds, for example, closes the solenoid-operated valve 472.

The boiled soybean milk delivered to the forming tank 48 is mixed with the coagulant therein, thus forming soybean curd.

A process of for manufacturing soybean curd according to another embodiment will be described with reference to FIGS. 6 and 7.

Figure 6:
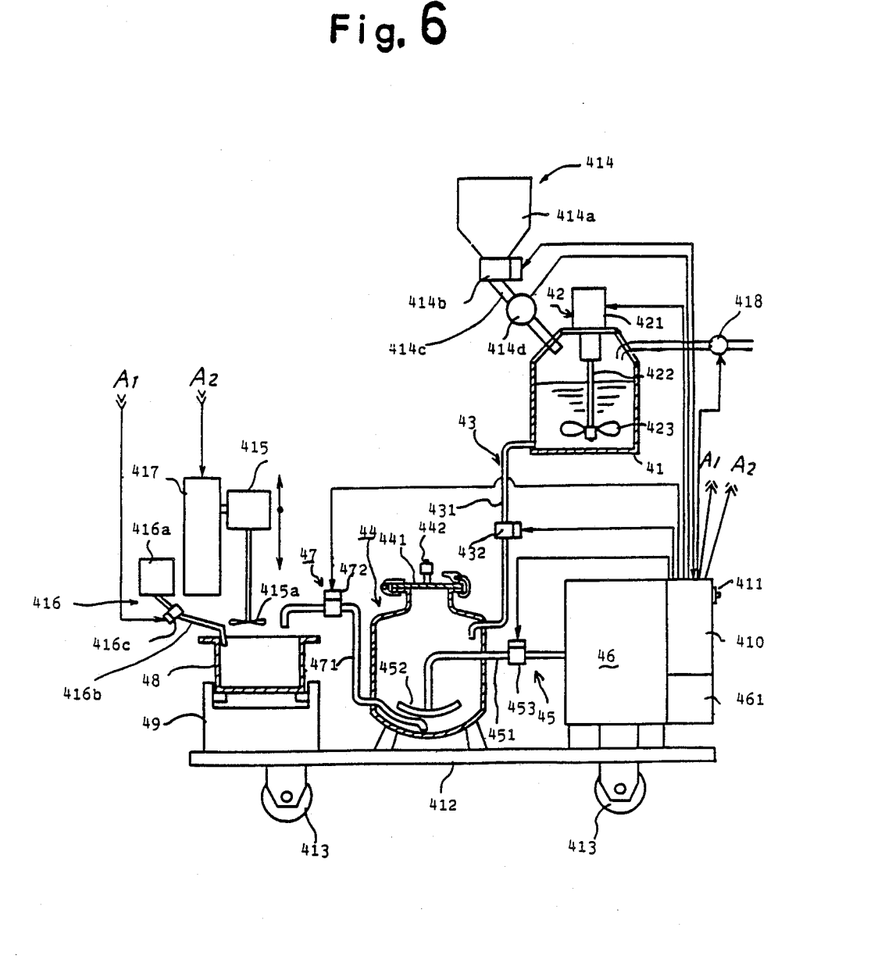
FIG. 6 is a side elevational view showing a process of manufacturing soybean curd according to another embodiment of the present invention.
Figure 7:
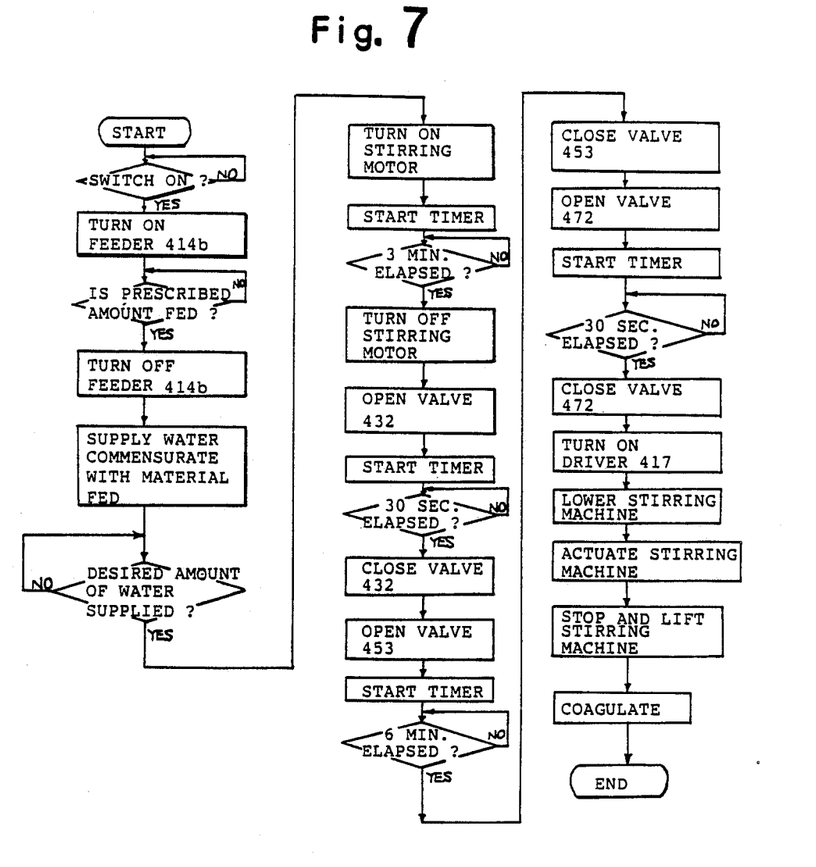
FIG. 7 is a flowchart of an operation sequence the process of manufacturing soybean curd shown in FIG. 6.

FIG. 6 schematically shows portion of the apparatus for manufacturing soybean curd according to another embodiment, which has a stirring tank 41, a stirring means 42, an introducing means 43, a boiling tank 44, a steam supply means 45, a boiler 46, a discharge means 47, a forming tank 48, a conveyor 49, and a control unit 410, which are identical to those of the apparatus shown in FIG. 4. These components are denoted by identical reference numerals and will not be described in detail. A material supply means 414 supplies a paste material, i.e., a mixture of soybean powder and water, to the stirring tank 41. The material supply means 414 comprises a hopper 414a for receiving the material, a feeder 414b for feeding the material from the hopper 414a to the stirring tank 41, a feed pipe 414c interconnecting the feeder 414b and the stirring tank 41, and a flowmeter 414d disposed in the feed pipe 414c for measuring the flow rate of the material flowing through the feed pipe 414c. The hopper 414a is schematically shown in FIG. 6, but actually mounted on the base 412, though the attachment structure is not illustrated for the sake of brevity. The paste material charged in the hopper 414a is fed by the feeder 414b controlled by the control unit 40 through the feed pipe 414c into the stirring tank 41. After a predetermined quantity of the paste material has been fed to the stirring tank 41, the feeder 414b is controlled by the control unit 40 to stop the supply of the material. The content of the forming tank 48 is stirred by a stirring machine 415 having an impeller 415a on the distal end of the shaft thereof. The coagulant is supplied to the forming tank 48 by a coagulant supply means 416 which comprises a container 416 for containing the coagulant, a pipe 416b interconnecting the container 416 and the forming tank 48, and a solenoid-operated valve 416c disposed in the pipe 416b for dripping the coagulant into the forming tank 48. The coagulant supply means 416 is mounted on the base 412, though not specifically shown. The stirring machine 415 is vertically movable by a driver 417 mounted on the base 412, though not specifically shown. Normally, the impeller 415a of the stirring machine 415 is pulled upwardly of the stirring tank 48. When boiled soybean milk starts to be discharged into the forming tank 48, the stirring machine 415 is lowered by the driver 417 to place the impeller 415 in the forming tank 48. Water to be supplied to the stirring tank 41 is controlled by a water valve 418.

An operation sequence of the apparatus shown in FIG. 6 is as follows:

(a) The control unit 410 ascertains whether the starter switch 411 is turned on or not. If turned on, the control unit actuates the feeder 414b to feed the paste material from the hopper 414a to the stirring tank 41. While the paste material is being fed to the stirring tank 41, the feed rate thereof is measured by the flowmeter 414d and delivered to the control unit 410, which accumulates the amount of paste material fed. When the amount of paste material supplied to the stirring tank 41 reaches a preset level, the control unit 410 stops the operation of the feeder 414b. Then, the control unit 410 opens the water valve 418 to supply water in a quantity commensurate with the amount of paste material fed to the stirring tank 41. In this embodiment, the rate of flow of water through the water valve 418 is constant, and hence the quantity of water supplied is a function of time. However, a flowmeter may be associated with the water valve 418, and the control unit 410 may accumulate the amount of water supplied on the basis of a signal from the flowmeter to check if a desired amount of water has been supplied to the stirring tank 41. After water has been introduced into the stirring tank 41, control goes to the step of rotating the stirring motor 421 of the stirring means 42 as shown in FIG. 5.

(b) Then, the steps described above in (2) through (4) are executed until the solenoid-operated valve 472 of the discharge means 47 is closed.

(c) Thereafter, the control unit 410 actuates the driver 417 to lower the stirring machine 415 for thereby bringing the impeller 415a into the forming tank 48. As the stirring machine 415 operates, the control unit 410 opens the solenoid-operated valve 416c for a time interval commensurate with the amount of soybean milk that has been supplied to the forming tank 48, thereby to add the coagulant to the soybean milk in the forming tank 48. The soybean milk and the coagulant are stirred and mixed by the impeller 415a. After the soybean milk and the coagulant have sufficiently been mixed, the stirring machine 415 is stopped and lifted to raise the impeller 415a clear off the soybean milk. Thereafter, the protein of the soybean milk is allowed to coagulate to form soybean curd or "tofu" in the forming tank 48.

In the embodiment of FIG. 6, since the soybean powder is mixed with water in advance, the protein of the soybean is eluted into the water. This shortens a time required for boiling the soybean milk and reduces the speed of coagulation. In addition, no undissolved masses or balls of soybean powder are formed in the stirring tank 41.

With the arrangement of the present invention, as described above, the operative components of the apparatus are controlled by the control unit for automatic operation, and the operator is required only to supply soybean powder and water to the stirring tank and apply a starting command to the control unit. Therefore, soybean curd can be manufactured without a complex process of manual operations. Since the steps of the soybean curd manufacturing process are automatically controlled by the control unit, soybean curd of stable and uniform quality can be produced at all times.

The boiling tank may be a double-walled tank with steam supplied into an outer chamber defined between the two walls. An inverting tank may be disposed between the boiling tank and the forming tank. Furthermore, a stirring machine may be disposed in the boiling tank.

Although certain preferred embodiments have been shown and described, it should be understood that many changes and modifications may be made therein without departing from the scope of the appended claims.

What I claim:

1. An apparatus for manufacturing soybean curd from soybean powder, comprising:
   a stirring tank having stirring means for stirring soybeans and water into soybean milk;
   a boiling tank for boiling the soybean milk;
   introducing means for introducing the soybean milk from said stirring tank into said boiling tank;
   steam supply means for supplying steam to said boiling tank;
   discharge means of discharging the boiled soybean milk from said boiling tank;
   a forming tank for mixing the boiled soybean milk discharged from said boiling tank with a coagulant to cause the soybean milk to coagulate into soybeancurd; and
   a control unit for successively operating said stirring means, said introducing means, said steam supply means, and said discharge means.

2. An apparatus according to claim 1, further including a base having casters, said stirring tank, said boiling tank, said steam supply means, said forming tank, and said control unit being mounted on said base.

3. An apparatus for manufacturing soybean curd from soybean powder, comprising:
   a stirring tank having stirring means for stirring soybeans and water into soybean milk;
   material supply means for supplying a soybean powder material to said stirring tank;
   a boiling tank for boiling the soybean milk;
   introducing means for introducing the soybean milk from said stirring tank into said boiling tank;
   steam supply means for supplying steam to said boiling tank;
   discharge means for discharging the boiled soybean milk from said boiling tank;
   a forming tank for mixing the boiled soybean milk discharged from said boiling tank with a coagulant to cause the soybean milk to coagulate into soybean curd; and
   a control unit for successively operating said material supply means, said stirring means, said introducing means, said steam supply means, and said discharge means.

4. An apparatus according to claim 3, wherein said material supply means supplies a paste material composed of soybean powder and water that are mixed together.

5. An apparatus for manufacturing soybean curd from soybean powder, comprising:
   a stirring tank having stirring means for stirring soybeans and water into soybean milk;
   a boiling tank for boiling the soybean milk;
   introducing means for introducing the soybean milk from said stirring tank into said boiling tank;
   steam supply means for supplying steam to said boiling tank;
   discharge means for discharging the boiled soybean milk from said boiling tank;
   a forming tank for mixing the boiled soybean milk discharged from said boiling tank with a coagulant;
   a stirring machine for stirring the boiled soybean milk and the coagulant in said forming tank to cause the soybean milk to coagulate into soybean curd; and
   a control unit for successively operating said stirring means, said introducing means, said steam supply means, said discharge means, and said stirring machine.

6. An apparatus according to claim 5, further including a driver for vertically moving said stirring machine with respect to said forming tank.

7. An apparatus for manufacturing soybean curd from soybean powder, comprising:
   a stirring tank having stirring means for stirring soybeans and water into soybean milk;
   a boiling tank for boiling the soybean milk;
   introducing means for introducing the soybean milk from said stirring tank into said boiling tank;
   steam supply means for supplying steam to said boiling tank;
   discharge means for discharging the boiled soybean milk from said boiling tank;
   a forming tank for mixing the boiled soybean milk discharged from said boiling tank with a coagulant to cause the soybean milk to coagulate into soybean curd;
   coagulant supply means for supplying the coagulant into said forming tank; and
   a control unit for successively operating said stirring means, said introducing means, said steam supply means, said discharge means, and said coaculant supply machine.

8. A soybean processing system for manufacturing deodorized soybean powder and nondeodorized soybean powder from soybeans, and for manufacturing soybean curd from the nondeodorized soybean powder, comprising:
   a separator for separating the soybeans into hulls and cotyledons;
   dividing means for dividing and discharging the cotyledons into two outlets;
   means for processing nondeodorized cotyledons discharged from one of said outlets to produce a nondeodorized soybean powder;
   deodorizing means for heating and moistening the cotyledons discharged from the other outlet to deodorize the same;
   means for drying the deodorized cotyledons from said deodorizing means to produce a deodorized soybean powder;

means for processing the deodorized powder to produce soybean milk from the protein contained therein;

coagulating means for coagulating the soybean protein contained in the soybean milk; and formimg means for forming the coagulated soybean protein into a prescribed shape.

9. A soybean processing system according to claim 8, wherein said separator comprises a scarring machine for scarring the hulls of the soybeans, a drying machine for drying the soybeans with the scarred hulls, a dehulling machine for removing the hulls from the cotyledons of the soybeans dried by said drying machine, and a classifier for separating the cotyledons and the hulls removed by said dehulling machine.

10. A soybean processing system according to claim 8, wherein said means for processing nondeodorized cotyledons comprises a crusher for cracking the cotyledons, a drying machine for drying the cracked cotyledons, and a grinder for grinding the cracked cotyledons dried by said drying machine.

11. A soybean processing system according to claim 8, wherein said means for processing nondeodorized cotyledons comprises a crusher for cracking the cotyledons, a drying machine for drying the cracked cotyledons, a grinder for grinding the cracked cotyledons dried by said drying machine into soybean powder, and a classifier for classifying the soybean powder and returning soybean powder of a particulate size larger than a prescribed level back to said grinder.

12. A soybean processing system according to claim 8, wherein said means for processing deodorized powder comprises a crusher for cracking the cotyledons deodorized by said deodorizing means, and a classifier for classifying the soybean powder and returning soybean powder of a particle size larger than a prescribed level back to said crusher.

13. A soybean processing system according to claim 8, wherein said means for processing the deodorized powder and said coagulating means includes:

a stirring tank having stirring means for stirring soybeans and water to produce a soybean milk therefrom;

a boiling tank for receiving and boiling the soybean milk;

steam supply means for supplying steam to said boiling tank;

a formimg tank for receiving the boiled soybean milk from said boiling tank and mixing the milk with a coagulant to cause the soybean milk to coagulate into soybean curd; and a control unit for controlling the operation of said stirring means and said steam supply means.

14. A soybean processing system according to claim 13, further including a base having casters, said stirring tank, said boiling tank, said steam supply means, said forming tank, and said control unit being mounted on said base.

15. A soybean processing system according to claim 8, wherein said means for processing the deodorized powder, said coagulating means, and said forming tank include:

a stirring tank having stirring means for stirring soybeans and water to produce a soybean milk therefrom;

means for suppyling the deodorized soybean powder produced by said means for drying the deodorized cotyledons to said stirring tank;

a boiling tank for receiving and boiling the soybean milk;

steam supply means for supplying steam to said boiling tank;

a forming tank for receiving the boiled soybean milk from said boiling tank and mixing the milk with a coagulant to cause the soybean milk to coagulate into soybean curd; and a control unit for controlling the operation of said stirring means and said steam supply means.

16. A soybean processing system according to claim 15, wherein said means for supplying includes means for mixing soybean powder and water and supplying a paste material composed of soybean powder and water to said stirring tank.

17. A soybean processing system according to claim 8, wherein said means for processing deodorized powder, said coagulating means, and said forming means include:

a stirring tank having stirring means for stirring soybeans and water to produce a soybean milk therefrom;

a boiling tank for receiving and boiling the soybean milk;

steam supply means for supplying steam to said boiling tank;

a formimg tank for receiving the boiled soybean milk from said boiling tank and mixing the milk with a coagulant to cause the soybean milk to coagulate into soybean curd;

a stirring machine for stirring the boiled soybean milk and the coagulant in said forming tank; and a control unit for controlling the operation of said stirring means, said steam supply means, and said stirring machine.

18. A soybean processing system according to claim 17, further including a driver for vertically moving said stirring machine with respect to said forming tank.

19. A soybean processing system according to claim 17, wherein said means for processing deodorized powder, said coagulating means, and said forming means further include:

coagulant supply means for supplying the coagulant into said forming tank, and said control unit includes means for controlling operation of said coagulant supply means.

* * * * *

UNITED STATES PATENT AND TRADEMARK OFFICE
CERTIFICATE OF CORRECTION

PATENT NO. : 4,813,347
DATED : March 21, 1989
INVENTOR(S) : KOICHI YOSHIDA

It is certified that error appears in the above-identified patent and that said Letters Patent is hereby corrected as shown below:

[FRONT PAGE]

[54] "SYSTEM FOR MANUFACTURING SOYBEAN POWDER" should be

--SOYBEAN PROCESSING SYSTEM--.

Signed and Sealed this

Fourth Day of July, 1989

Attest:

DONALD J. QUIGG

Attesting Officer

Commissioner of Patents and Trademarks